United States Patent [19]

Toda et al.

[11] Patent Number: 5,508,355
[45] Date of Patent: Apr. 16, 1996

[54] VULCANIZABLE FLUORINE-CONTAINING ELASTOMER COMPOSITION

[75] Inventors: Keiichi Toda, Yokohama; Shinichi Shibayama, Kawasaki; Hiroshi Saitou, Chiba, all of Japan

[73] Assignee: E. I. Du Pont de Nemours and Company, Wilmington, Del.

[21] Appl. No.: 313,104

[22] PCT Filed: Apr. 1, 1993

[86] PCT No.: PCT/JP93/00415

§ 371 Date: Sep. 30, 1994

§ 102(e) Date: Sep. 30, 1994

[87] PCT Pub. No.: WO93/20143

PCT Pub. Date: Oct. 14, 1993

[30] Foreign Application Priority Data

Apr. 3, 1992 [JP] Japan .................................. 4-082147

[51] Int. Cl.⁶ .............................................. C08F 8/00
[52] U.S. Cl. ...................... 525/340; 525/326.3; 525/353; 525/375; 525/379
[58] Field of Search .................... 525/379, 340, 525/353, 375

[56] References Cited

U.S. PATENT DOCUMENTS 3,622,549  11/1971  Keller ........................................ 525/379
4,151,342   4/1979  Uchino et al. .......................... 525/379

FOREIGN PATENT DOCUMENTS 1390847   4/1975   United Kingdom.

*Primary Examiner*—Bernard Lipman
*Attorney, Agent, or Firm*—Marilyn H. Bromels

[57] ABSTRACT

Disclosed is a vulcanizable, fluorine-containing elastomer composition comprising (a) a vulcanizable, fluorine-containing elastomer, (b) a polyol vulcanizing agent comprising a polyol compound as a crosslinking agent, and (c) an aliphatic amine compound represented by the formula: $R_\alpha NH_\beta$ wherein R represents an alkyl group, $\alpha$ represents an integer of from 1 to 3, and $\beta$ represents 3 minus $\alpha$. The vulcanizable, fluorine-containing elastomer composition of the present invention is capable of providing a vulcanization product having not only excellent tensile properties, resistance to heat and oils, and sealability at high temperatures which are comparable to those of vulcanization products of conventional fluorine-containing elastomer compositions, but also having a remarkably improved compression set resistance which has not conventionally been achieved, and the elastomer composition per se is remarkably improved with respect to mold release properties, flowability, roll processability, and workability in vulcanization molding, particularly in vulcanization molding by injection.

14 Claims, No Drawings

VULCANIZABLE FLUORINE-CONTAINING ELASTOMER COMPOSITION

TECHNICAL FIELD

The present invention relates to a novel vulcanizable, fluorine-containing elastomer composition. More particularly, the present invention is concerned with a vulcanizable, fluorine-containing elastomer composition which is capable of providing a vulcanization product having not only excellent tensile properties, resistance to heat and oils, and sealability at high temperatures which are comparable to those of vulcanization products of conventional fluorine-containing elastomer compositions, but also having a remarkably improved compression set resistance which has not conventionally been achieved, and which elastomer composition per se is remarkably improved with respect to mold release properties, flowability, roll processability, and workability in vulcanization molding, particularly in vulcanization molding by injection.

BACKGROUND ART

In general, a vulcanization product of a fluorine-containing elastomer has excellent resistance to heat and oils and, therefore, has been widely utilized in various industrial fields, such as in the fields of automobiles, ships, aircrafts and hydraulic devices and general machine industries, and in the field of devices for the prevention of environmental pollution. Examples of vulcanization products of a fluorine-containing elastomer include O-rings, gaskets, oil seals, diaphragms, hoses, rolls and sheets. Recently, an improvement in productivity and a labor-saving have been earnestly desired in the production of vulcanization products. Accordingly, it has been desired to develop a fluorine-containing elastomer having excellent workability in a vulcanization molding thereof. Particularly, since vulcanization molding of a fluorine-containing elastomer by injection is advantageous from a viewpoint of not only an improvement in productivity but also a labor-saving, the demand for a fluorine-containing elastomer which is suitable for vulcanization molding by injection, has increased.

As mentioned above, a vulcanization product of a fluorine-containing elastomer composition has excellent resistance to heat and oils. However, a fluorine-containing elastomer is generally not satisfactory in mold processability due to the high viscosity thereof as compared to other types of elastomers. In order to improve processability of a fluorine-containing elastomer composition, it has been attempted to lower the molecular weight of the elastomer so as to increase the flowability of the elastomer composition. However, this attempt has been unsuccessful. That is, the obtained elastomer composition is disadvantageous not only in that its workability is poor in roll molding due to occurrence of an unfavorably strong adhesion of the elastomer composition to the roll, but also in that a low molecular weight elastomer is difficult to crosslink by a polyol vulcanization, so that the important properties of vulcanization products, such as compression set resistance, are likely to be unsatisfactory.

Further, when a fluorine-containing elastomer having a low molecular weight is vulcanization molded by injection, the resultant molded product is poor in mold release properties, so that problems arise in working efficiency. In addition, when an elastomer having a low molecular weight is used for producing a molded product having a complicated configuration, the molded product is likely to suffer cracking, breakage and swelling, leading to a lowering of yield and productivity.

In order to improve the processability of fluorine-containing elastomers, it has been proposed to use a processing aid, such as a higher fatty acid ester, a silicone compound and a low molecular weight polyethylene (see, for example, Examined Japanese Patent Application Publication No. 52-44896 corresponding to U.S. Pat. No. 4,065,419). However, when the processing aid is used in a small amount, a satisfactory improvement of processability cannot be achieved. On the other hand, when the processing aid is used in an amount sufficient to improve the processability, the vulcanization molded product becomes very poor in tensile strength and sealability at high temperatures. Further, in order to improve the mold release properties of fluorine-containing elastomers, it has been attempted to use an external mold release agent, and an internal mold release agent, such as a higher fatty acid ester, a silicone compound, a fatty acid amide, or a low molecular weight polyethylene. However, when an internal mold release agent is used in an amount sufficient to improve the mold release properties, the vulcanization molded product becomes very poor in tensile strength and sealability at high temperatures. On the other hand, when an external mold release agent is used, since the effect of the agent to improve mold release properties is lowered as the molding is repeated many times, it is disadvantageously necessary to repeatedly coat the agent on the surface of a mold and, in addition, a trace of the external mold release agent is likely to remain on the surface of the molded product, so that the molded product is of no commercial value.

In the above context, studies have been made in order to solve the above-mentioned problems.

For example, there has been proposed a method in which N,N,N',N'-tetrasubstituted 1,8-diaminonaphthalene is incorporated in a fluorine-containing elastomer composition (see Examined Japanese Patent Application Publication No.2-50140 corresponding to U.S. Pat. No. 4,529,759), a method in which a perfluoropolyether having a brominated terminal group is added to a fluorine-containing elastomer composition (see Unexamined Japanese Patent Application Laid-Open Specification No. 62-143951 corresponding to U.S. Pat. No. 5,061,759), a method in which a telomer of or a cotelomer of a vinylidene fluoride, each having bromine or iodine at a terminal thereof, is added to a fluorine-containing elastomer composition (see Unexamined Japanese Patent Application Laid-Open Specification No. 63-92664 corresponding to European Patent Publication No. 251285), and a method in which an alkyl cellosolve is added to a fluorine-containing elastomer composition (see Unexamined Japanese Patent Application Laid-Open Specification No. 63-189450). However, such additives are either special chemicals and therefore expensive, or highly inflammable liquids, so that the practical use of these additives on a commercial scale has been limited.

Further, in Examined Japanese Patent Application Publication No. 57-8124, there is disclosed a method in which an amine or a salt thereof as a vulcanizing additive is added to an aqueous emulsion of a fluorine-containing copolymer at a coagulation thereof. However, this method pertains to a diamine vulcanization method and, therefore, satisfactory results cannot be obtained with respect to the processability thereof in a vulcanization molding and to the properties of the vulcanization product obtained.

DISCLOSURE OF THE INVENTION

It is an object of the present invention to provide a vulcanizable, fluorine-containing elastomer composition which is capable of providing a vulcanization product having not only excellent tensile properties, resistance to heat and oils, and sealability at high temperatures which are comparable to those of vulcanization products of conventional fluorine-containing elastomer compositions, but also having a remarkably improved compression set resistance which has not conventionally been achieved, and which elastomer composition per se is remarkably improved with respect to mold release properties, flowability, roll processability, and workability in vulcanization molding, particularly in vulcanization molding by injection.

The present inventors have made extensive and intensive studies. As a result, it has unexpectedly been found that the above object can be attained by blending a vulcanizable composition, comprising a fluorine-containing elastomer and a polyol, with a specific aliphatic amine compound. More specifically, the present inventors have found that when a vulcanizable mixture of a fluorine-containing elastomer and a polyol is blended with an aliphatic amine compound represented by the formula: $R_\alpha NH_\beta$ wherein R represents an alkyl group, $\alpha$ represents an integer of from 1 to 3, and $\beta$ represents 3 minus $\alpha$, it becomes possible to obtain a vulcanizable, fluorine-containing elastomer composition which is capable of providing a vulcanization product having not only various excellent properties which are comparable to those of vulcanization products of conventional fluorine-containing elastomer compositions, but also having a remarkably improved compression set resistance which has not conventionally been achieved, and which elastomer composition per se is remarkably improved with respect to mold release properties, flowability, and workability in vulcanization molding, particularly in vulcanization molding by injection. The present invention has been completed, based on this finding.

According to the present invention, there is provided a vulcanizable, fluorine-containing elastomer composition comprising:

(a) a vulcanizable, fluorine-containing elastomer;

(b) a polyol vulcanizing agent comprising a polyol compound as a crosslinking agent; and (c) an aliphatic amine compound represented by the formula:

$$R_\alpha NH_\beta \qquad (I)$$

wherein R represents an alkyl group, $\alpha$ represents an integer of from 1 to 3, and $\beta$ represents 3 minus $\alpha$.

Examples of vulcanizable, fluorine-containing elastomers, which are employed as component (a) in the composition of the present invention, include a fluorine-containing elastomer comprising vinylidene fluoride units, hexafluoropropene units and optionally tetrafluoroethylene units; a fluorine-containing elastomer comprising vinylidene fluoride units, perfluorovinylether units and tetrafluoroethylene units; a fluorine-containing elastomer comprising perfluorovinylether units and tetrafluoroethylene units; a fluorine-containing elastomer comprising tetrafluoroethylene units, propylene units and optionally vinylidene fluoride units; and a fluorophosphazene elastomer.

Among these, the fluorine-containing elastomer comprising vinylidene fluoride units, hexafluoropropene units and optionally tetrafluoroethylene units is especially preferred.

In the above-mentioned fluorine-containing elastomer comprising vinylidene fluoride units (hereinafter referred to as "VDF units") and hexafluoropropene units (hereinafter referred to as "HFP units"), it is preferred that the weight ratio of VDF units to HFP units be in the range of from 40:60 to 80:20. When the ratio of VDF units is lower than the above range, it is difficult to obtain an elastomer having a high molecular weight and, therefore, the production cost is increased. On the other hand, when the ratio of VDF units is larger than the above range, the fluorine-containing elastomer obtained is likely to be resinous and is low in elasticity. When the above-mentioned fluorine-containing elastomer further comprises tetrafluoroethylene units (hereinafter referred to as "TFE units"), it is preferred that the content of TFE units be not greater than 35% by weight, based on the total weight of VDF units, HFP units and TFE units. When the content of TFE units exceeds 35% by weight, the fluorine-containing elastomer is likely to be low in elasticity.

The polyol vulcanizing agent as component (b) comprises a polyol compound as a crosslinking agent. Examples of polyol compounds as crosslinking agents include bisphenol AF, bisphenol A, bisphenol S, dihydroxybenzophenone, hydroquinone, 2,4,6-trimercapto-symtriazine, 4,4'-thiodiphenol and metal salts thereof.

In the vulcanizable, fluorine-containing elastomer composition of the present invention, the polyol compound as a crosslinking agent is generally present in an amount of from 0.1 to 10 parts by weight, preferably from 0.5 to 5 parts by weight, per 100 parts by weight of component (a).

The polyol vulcanizing agent (b) can further comprise a vulcanization accelerator which functions as a catalyst in the crosslinking reaction.

Examples of vulcanization accelerators include a phosphonium salt, an ammonium salt, an iminium salt, a sulfonium salt and an aminophosphine derivative. Specific examples thereof include tetramethylammonium chloride, tetrabutylammonium chloride, tetramethylammonium bromide, benzyltriphenylphosphonium chloride, bis(benzyldiphenylphosphine)iminium chloride and DBU salts, such as 1,8-diazabicylo[5,4,0]-7-undecenium chloride and 1,8-diazabicyclo[5,4,0]-7-undecenium bromide.

In the vulcanizable, fluorine-containing elastomer composition of the present invention, the above vulcanization accelerator is generally present in an amount of from 0.05 to 10 parts by weight, preferably from 0.1 to 5 parts by weight, per 100 parts by weight of component (a).

If desired, various types of vulcanization promoters can be employed for enhancing the effect of the vulcanization accelerator. Representative examples of vulcanization promoters include sulfone compounds, such as dimethyl sulfone and dichlorodiphenyl sulfone.

Usually, in polyol vulcanization, a crosslinking reaction is conducted in the presence of a bivalent metal oxide and a bivalent metal hydroxide as an acid acceptor. Each of the bivalent metal oxide and the bivalent metal hydroxide is generally used in an amount of from 1 to 10 parts by weight, per 100 parts by weight of component (a). The total amount of the bivalent metal oxide and the bivalent metal hydroxide is generally from 2 to 20 parts by weight, per 100 parts by weight of component (a).

Examples of bivalent metal oxides and bivalent metal hydroxides include oxides and hydroxides of magnesium, calcium, zinc and lead.

Component (c) is an aliphatic amine compound represented by the formula: $R_\alpha NH_\beta$ wherein R represents an alkyl group, $\alpha$ represents and integer of from 1 to 3, and $\beta$ represents 3 minus $\alpha$. The alkyl group of the aliphatic amine compound has preferably from 12 to 22 carbon atoms, more preferably from 14 to 18 carbon atoms. From a viewpoint of a good compatibility of the aliphatic amine compound with the fluorine-containing elastomer, and an appropriate melting point of the amine compound, it is preferred that the number of carbon atoms of the alkyl group be within the above range. By the use of an aliphatic amine compound having such an alkyl group, the vulcanizable, fluorine-containing elastomer composition of the present invention can exhibit especially excellent effects as desired. The most excellent effects of the fluorine-containing elastomer composition of the present invention can be achieved when the number of carbon atoms of the alkyl group of the aliphatic amine compound is in the range of from 12 to 22. Specific examples of aliphatic amine compounds include monotetradecylamine, monohexadecylamine, monooctadecylamine, monodecylamine, monodocosenylamine, monooleylamine, ditetradecylamine, dihexadecylamine, dioctadecylamine, didecylamine, didocosenylamine, dioleylamine, tritetradecylamine, trihexadecylamine, trioctadecylamine, tridecylamine, tridocosenylamine and trioleylamine. These aliphatic amine compounds can be used individually or in combination.

In the vulcanizable, fluorine-containing elastomer composition of the present invention, the aliphatic amine compound as component (c) is present in an amount of from 0.05 to 10 parts by weight, preferably from 0.1 to 5 parts by weight, per 100 parts by weight of the vulcanizable, fluorine-containing elastomer. When component (c) is present in an amount of less than 0.05 parts by weight, satisfactory effects cannot be obtained. On the other hand, when component (c) is present in an amount of more than 10 parts by weight, the properties of a vulcanization product obtained by vulcanization of the composition of the present invention, such as compression set resistance and tensile strength, are lowered to a large extent.

If desired, other components, such as a filler, a processing aid, a plasticizer and a coloring agent, can be added to the composition of the present invention. Examples of such components include carbon black, Austin Black, graphite, silica clay, diatomaceous earth, talc, Wollastonite, calcium carbonate, calcium silicate, calcium fluoride, barium sulfate, a sulfone compound, a phosphoric ester, a higher fatty acid ester, a fatty acid calcium salt, a fatty acid amide, a low molecular weight polyethylene, a silicone oil, a silicone grease, a metal soap, stearic acid, calcium stearate, magnesium stearate, aluminium stearate, zinc stearate, titanium white and red iron oxide. These components are employed in such an amount as conventionally employed in the art.

Particularly, when a processing aid comprising at least one higher fatty acid ester is used in combination with the aliphatic amine compound, the mold release properties, flowability and roll processability of the fluorine-containig elastomer composition in vulcanization molding can be further improved. When a higher fatty acid ester is used alone, properties of the resultant vulcanization product, such as tensile strength and compression set resistance, are markedly deteriorated. However, when a higher fatty acid ester is used in the presence of the aliphatic amine compound, excellent mold release properties, flowability and roll processability can be achieved without sacrificing the above-mentioned desired properties of the vulcanization product.

Preferred examples of such a processing aid comprising at least one higher fatty acid ester include a purified product of wax obtained from an animal, a plant or a mineral. Specifically, candelilla wax, rice bran wax, carnauba wax, montan wax and shellac wax are preferably used. Among these, candelilla wax, rice bran wax and carnauba wax are most preferred.

The above-mentioned processing aid comprising at least one higher fatty acid ester is used in an amount of from 0.1 to 10 parts by weight, preferably from 0.2 to 5 parts by weight, per 100 parts by weight of the vulcanizable, fluorine-containing elastomer as component (a).

Further, in the present invention, at least one of the conventional vulcanizing agents, such as a peroxide type vulcanizing agent and a diamine type vulcanizing agent, can be employed in an amount such that the vulcanizing agents employed do not spoil the effects of the present invention.

The fluorine-containing elastomer composition of the present invention can be prepared by mixing and kneading the above-mentioned components (a), (b) and (c), and optionally additives, by means of rolls or a Banbury mixer.

As a method for vulcanizing the thus obtained fluorine-containing elastomer composition of the present invention, there can be mentioned, for example, a method in which the fluorine-containing elastomer composition is further well kneaded by means of an open roll mill or an internal mixer (such as a Banbury mixer and pressure kneader), and cut into ribbon-like strips and subjected to injection molding, to thereby obtain a molded vulcanization product. In this method, the obtained product may further be subjected to postcuring, if desired. Generally, the above-mentioned vulcanization molding by injection is conducted at a mold temperature of from 150° C. to 200° C. for 1 to 10 minutes. A postcuring is generally conducted at a temperature of from 150° C. to 250° C. for 1 to 48 hours. As examples of other methods for vulcanizing the fluorine-containing elastomer composition, there can be mentioned a method in which the fluorine-containing elastomer composition is subjected to compression molding and, then, the resultant molded product is subjected to postcuring; a method in which the fluorine-containing elastomer composition is preliminarily molded by, for example, extrusion and, then, subjected to vulcanization; and a method in which the fluorine-containing elastomer composition is dissolved or dispersed in at least one medium selected from ketones (e.g., methylethylketone and acetone) and ethers (e.g., ethyl ether and tetrahydrofuran) to thereby obtain a solution or a dispersion of the elastomer composition, and the surface of an article, such as a paper, a fiber, a film, a sheet, a board, a tube, a pipe, a tank or a large-sized container, is coated with the solution or dispersion and dried to obtain a coated article, followed by vulcanization. Further, the fluorine-containing elastomer composition of the present invention can be laminated to other types of rubbers, such as NBR, an acrylic rubber and an EP rubber, to thereby prepare laminate structures, such as a laminate sheet and a laminate hose.

BEST MODE FOR CARRYING OUT THE INVENTION

Hereinbelow, the present invention will be described in more detail with reference to the following Examples and Comparative Examples, which should not be construed as limiting the scope of the present invention.

With respect to the vulcanization products obtained by the vulcanization of the vulcanizable, fluorine-containing elastomer composition of the present invention, various properties of the products as well as mold release properties were measured by the following methods.

(1) Hardness was measured in accordance with JIS-A, and 100% tensile stress, tensile strength and elongation were individually measured in accordance with JIS-K6301.

(2) Compression set resistance was measured in accordance with JIS-K6301, using a sample material prescribed therein, under conditions of 175° C. for 22 hours.

(3) Mold release properties were measured using a metallic mold for producing 48 pieces of P-10 type dynamic O-rings. 10 Shots of vulcanization molding by injection were made without using an external release agent, and the mold release properties of the molded vulcanization products were evaluated in terms of the following 5 criteria:

⊚: the O-ring can be easily removed from the mold.

○: the O-ring can be easily removed from the mold, except for a sprue lock portion thereof.

Δ: some of burrs of the O-ring are adhered to the mold.

▲: a part of the O-ring is adhered to the mold, but can be removed.

X: the O-ring is adhered to the mold, broken at a deburring portion of the mold, and entirely left in the mold.

The extrusion properties mentioned below are evaluated by an extrusion test, which is conducted using extruder Model 10DW (D: 19.1 mm, L/D: 10) (manufactured and sold by Brabender OHG, Germany) and a tube die (outer diameter: 9 mm, inner diameter: 8 mm) under conditions such that the screw temperature is 60° C., the head temperature is 100° C. and the revolution number of the screws is 50 rpm.

The texture of a tubular extrudate is evaluated by visual observations of the fineness of the texture, into 5 grades in the excellence order from 5 to 1.

The extrusion speed is calculated based on the length of the extrudate discharged per unit time.

Garvey Die (ASTM D2230-77A), which is capable of extruding a polygon-shaped extrudate having sharp edges, is used instead of the tube die, and the edge of the extrudate is evaluated by visual observations into 5 grades in the excellence order from 5 to 1, with respect to a sample obtained by extrusion.

EXAMPLE 1

100 Parts by weight of fluorine-containing elastomer A, which comprises 60% by weight of vinylidene fluoride (VDF) units, 31% by weight of hexaflouropropene (HFP) units and 9% by weight of tetrafluoroethylene (TFE) units, each based on the total weight of VDF units, HFP units and TFE units, and which has a fluorine content of 66% by weight, based on the total weight of VDF units, HFP units and TFE units, and has a mooney viscosity of 110 (ML 121 °C. 1+10), was wound around an open roll mill, and 1.1 parts by weight of bisphenol AF and 0.3 part by weight of bis(benzyldiphenylphosphine)iminium chloride were kneaded with the fluorine-containing elastomer A, to thereby obtain a mixture. Then, 20 parts by weight of SRF carbon black ("SEAST S" manufactured and sold by Tokai Carbon Co. Ltd., Japan), 6 parts by weight of magnesium oxide ("KYOWAMAGU #30" manufactured and sold by KYOWA CHEMICAL INDUSTRY, Japan) and 2 parts by weight of calcium hydroxide ("Rhenofit-CF" manufactured and sold by Rhein Chemie Rheinau GmbH, Germany) were kneaded with the above-obtained mixture and then, 1.0 part by weight of octadecylamine was further kneaded, thereby obtaining a fluorine-containing elastomer composition. The obtained fluorine-containing elastomer composition was allowed to stand still over night, thereby aging the composition.

The thus aged elastomer composition was subjected to re-kneading, and the re-kneaded elastomer composition was placed in a metallic mold, followed by press vulcanization at 180° C. for 5 minutes, thereby obtaining a vulcanization product which was in the form of a sheet. The sheet was taken out from the mold and heated in an air circulation chamber at 230° C. for 24 hours, thereby performing a postcuring. The resultant sheet was subjected to various tests.

The mold release properties of the above-mentioned elastomer composition was evaluated by cutting the rekneaded elastomer composition into ribbon-like strips, and the strips were subjected to injection molding using a metallic mold at a temperature of 180° C., followed by evaluation of mold release properties.

The formulation of the above-mentioned elastomer composition is shown in Table 1. With respect to the molded, vulcanization product, various properties in an ordinary state, compression set resistance, mold release properties and optimum vulcanization time are shown in Table 2.

EXAMPLE 2

Substantially the same procedure as in Example 1 was repeated except that as candelilla wax, 1 part by weight of "Serarica NC-1630" (manufactured and sold by Noda Wax Company Ltd., Japan) was added to the elastomer composition. The formulation of the elastomer composition is shown in Table 1, and the results of the tests are shown in Table 2.

EXAMPLE 3

Substantially the same procedure as in Example 1 was repeated except that the amount of octadecylamine was changed from 1.0 part by weight to 0.5 part by weight and as candelilla wax, 1 part by weight of "Serarica NC-1630" (manufactured and sold by Noda Wax Company Ltd., Japan) was added to the elastomer composition. The formulation of the elastomer composition is shown in Table 1, and the results of the tests are shown in Table 2.

EXAMPLE 4

Substantially the same procedure as in Example 1 was repeated except that 1.0 part by weight of dioctadecylamine was used instead of 1.0 part by weight of octadecylamine. The formulation of the elastomer composition is shown in Table 1, and the results of the tests are shown in Table 2.

EXAMPLE 5

Substantially the same procedure as in Example 1 was repeated except that 1.0 part by weight of trioctadecylamine was used instead of 1.0 part by weight of octadecylamine. The formulation of the elastomer composition is shown in Table 1, and the results of the tests are shown in Table 2.

COMPARATIVE EXAMPLE 1

Substantially the same procedure as in Example 1 was repeated except that 1.0 part by weight of octadecylamine was not used. The formulation of the elastomer composition is shown in Table 1, and the results of the tests are shown in Table 2.

COMPARATIVE EXAMPLE 2

Substantially the same procedure as in Comparative Example 1 was repeated except that 1.0 part by weight of a higher fatty acid ester was added to the elastomer composition. The formulation of the elastomer composition is shown in Table 1, and the results of the tests are shown in Table 2.

EXAMPLE 6

Substantially the same procedure as in Example 1 was repeated except that 1.0 part by weight of dodecylamine was used instead of 1.0 part by weight of octadecylamine. The formulation of the elastomer composition is shown in Table 1, and the results of the tests are shown in Table 2.

EXAMPLE 7

Substantially the same procedure as in Example 1 was repeated except that 1.0 part by weight of eicosylamine was used instead of 1.0 part by weight of octadecylamine. The formulation of the elastomer composition is shown in Table 1, and the results of the tests are shown in Table 2.

As compared to the vulcanization product obtained in Comparative Example 1 in which an internal mold release agent was not employed, the mold release properties of the respective vulcanization products obtained in Examples 1, 4 and 5, in which an elastomer composition of the present invention containing a specific aliphatic amine compound was employed, were remarkably improved. Further, even as compared to the vulcanization product obtained in Comparative Example 2 in which an internal mold release agent was used, the mold release properties of the respective vulcanization products obtained in Examples 1, 4, 5, 6 and 7 were also remarkably improved. In addition, in each of Examples 2 and 3, in which the aliphatic amine compound was used in combination with an internal mold release agent, the vulcanization products obtained show remarkably improved mold release properties.

EXAMPLES 8 AND 9, AND COMPARATIVE EXAMPLES 3 AND 4

Substantially the same procedure as in Example 1 was repeated except that the formulations of the elastomer compositions shown in Table 3 were employed and an extrusion test was additionally conducted, with respect to the obtained fluorine-containing elastomer composition which had been allowed to stand still over night for aging, prior to the re-kneading and placing in a metallic mold. Results are shown in Table 4.

In Example 8, the moony viscosity of the vulcanization product is low, and the extrusion properties of the vulcanization product are remarkably improved, as compared to Comparative Example 3 in which octadecylamine was not used.

In Example 9, the compression set resistance of the vulcanization product is remarkably improved, as compared to Comparative Example 4 in which octadecylamine was not used.

EXAMPLES 10 TO 12

Substantially the same procedure as in Example 1 was repeated except that the formulations of the elastomer compositions shown in Table 5 were employed. Results are shown in Table 6.

As is seen from the results of Example 10, the vulcanization product obtained from the elastomer composition of the present invention is excellent in thermal deterioration resistance.

As is seen from the results of Example 11, the vulcanization product obtained from the elastomer composition of the present invention has a low compression set.

As is seen from the results of Example 12, the vulcanization product of the present invention is excellent in properties under high temperature conditions.

From the above, it is apparent that the vulcanizable, fluorine-containing elastomer composition of the present invention is remarkably improved with respect to mold release properties, flowability, and workability in vulcanization molding, particularly in vulcanization molding by injection.

TABLE 1

| | Example 1 | Example 2 | Example 3 | Example 4 |
|---|---|---|---|---|
| Formulation | | | | |
| Fluorine-containing elastomer A | 100 | 100 | 100 | 100 |
| SRF carbon black | 20 | 20 | 20 | 20 |
| Calcium hydroxide | 2 | 2 | 2 | 2 |
| Low-activity magnesium oxide | 6 | 6 | 6 | 6 |
| Bisphenol AF | 1.1 | 1.1 | 1.1 | 1.1 |
| Bis(benzyltriphenylphosphine) iminium chloride | 0.3 | 0.3 | 0.3 | 0.3 |
| Octadecylamine | 1 | 1 | 0.5 | |
| Dioctadecylamine | | | | 1 |
| Candelilla wax | | 1 | 1 | |

| | Example 5 | Comp. Ex. 1 | Comp. Ex. 2 |
|---|---|---|---|
| Formulation | | | |
| Fluorine-containing elastomer A | 100 | 100 | 100 |
| SRF carbon black | 20 | 20 | 20 |
| Calcium hydroxide | 2 | 2 | 2 |
| Low-activity magnesium oxide | 6 | 6 | 6 |
| Bisphenol AF | 1.1 | 1.1 | 1.1 |
| Bis(benzyltriphenylphosphine) iminium chloride | 0.3 | 0.3 | 0.3 |
| Trioctadecylamine | 1 | | |
| Candelilla wax | | | 1 |

| | Example 6 | Example 7 |
|---|---|---|
| Formulation | | |
| Fluorine-containing elastomer A | 100 | 100 |
| SRF carbon black | 20 | 20 |
| Calcium hydroxide | 2 | 2 |
| Low-activity magnesium oxide | 6 | 6 |
| Bisphenol AF | 1.1 | 1.1 |
| Bis(benzyltriphenylphosphine) iminium chloride | 0.3 | 0.3 |
| Dodecylamine | 1 | |
| Eicosylamine | | 1 |

In Table 1:

Fluorine-containing elastomer A: a fluorine-containing ternary elastomer which contains 60% by weight of VDF, 31% by weight of HFP, 9% by weight of TFE, and 66% by weight of fluorine, each based on the total weight of VDF, HFP and TFE, and which has a mooney viscosity of 110 (ML 121 °C. 1+10)

SRF (semi-reinforcing furnace) carbon black: "SEAST S" manufactured and sold by Tokai Carbon Co., Ltd., Japan Calcium hydroxide: "Rhenofit-CF" manufactured and sold by Rhein Chemie Rheinau GmbH, Germany Low-activity magnesium oxide: "KYOWAMAGU #30" manufactured and sold by KYOWA CHEMICAL INDUSTRY, Japan Candelilla wax: "Serarica NC-1630" manufactured and sold by NODA WAX Co., Ltd., Japan

TABLE 2

|  | Example 1 | Example 2 | Example 3 | Example 4 | Example 5 | Comp. Example 1 | Comp. Example 2 | Example 6 | Example 7 |
|---|---|---|---|---|---|---|---|---|---|
| Properties in ordinary state | | | | | | | | | |
| 100% tensile stress (Kgf/cm$^2$) | 66 | 62 | 52 | 68 | 68 | 55 | 42 | 67 | 68 |
| Tensile strength at break (Kgf/cm$^2$) | 228 | 201 | 210 | 230 | 230 | 222 | 217 | 210 | 230 |
| Tensile elongation at break (%) | 250 | 260 | 280 | 240 | 240 | 290 | 320 | 278 | 240 |
| Hardness (JIS-A) (Pts) | 83 | 79 | 78 | 82 | 83 | 78 | 77 | 79 | 82 |
| Compression set 175° C. × 22 hours (%) | 8 | 8 | 10 | 8 | 8 | 20 | 10 | 10 | 7 |
| Mold release properties | ◯ | ⊚ | ⊚ | ◯ | ◯ | X | X~Δ | ◯ | ◯ |
| Optimum vulcanization time (tc(90)) (minutes) Monsanto ODR2000 185° C. | 3.6 | 3.9 | 4.6 | 3.3 | 3.4 | 5.3 | 8.1 | 4.1 | 3.2 |

TABLE 3

|  | Example 8 | Comp. Example 3 | Example 9 | Comp. Example 4 |
|---|---|---|---|---|
| Formulation | | | | |
| Fluorine-containing elastomer B | 60 | 60 | 100 | 100 |
| Fluorine-containing elastomer C | 40 | 40 | | |
| SRF carbon black | 25 | 25 | | |
| MT carbon black | | | 12 | 10 |
| Calcium hydroxide | 6 | 6 | 6 | 6 |
| High-activity magnesium oxide | 3 | 3 | 5 | 5 |
| Low-activity magnesium oxide | | | 5 | 5 |
| Bisphenol AF | 1.6 | 1.6 | 1.6 | 1.5 |
| Benzyltriphenylphosphonium chloride | | | 0.3 | 0.3 |
| Bis(benzyltriphenylphosphine) iminium chloride | 0.3 | 0.3 | | |
| Dimethylphosphine | 0.5 | 0.5 | | |
| Octadecylamine | 1 | | 0.5 | |
| Candelilla wax | | | 1 | 1 |

In Table 3:

Fluorine-containing elastomer B: a fluorine-containing binary elastomer which contains 63% by weight of VDF, 37% by weight of HFP, and 66% by weight of fluorine, each based on the total weight of VDF and HFP, and which has a mooney viscosity of 55 (ML 121 °C. 1+10).

Fluorine-containing elastomer C: a fluorine-containing binary elastomer which contains 63% by weight of VDF, 37% by weight of HFP, and 66% by weight of fluorine, each based on the total weight of VDF and HFP, and which has a mooney viscosity of 30 (ML 121 °C. 1+10).

SRF carbon black: "SEAST S" manufactured and sold by Tokai Carbon Co. Ltd., Japan MT (medium thermal) carbon black: "Thermax N-990" manufactured and sold by CANCARB Inc., Canada Calcium hydroxide: "CALVIT" manufactured and sold by Omi Chemical Industry, Japan High-activity magnesium oxide: "KYOWAMAGU #150" manufactured and sold by KYOWA CHEMICAL INDUSTRY, Japan Low-activity magnesium oxide: "KYOWAMAGU #30" manufactured and sold by KYOWA CHEMICAL INDUSTRY, Japan Candelilla wax: "Serarica NC-1630" manufactured and sold by Noda Wax Co. Ltd., Japan

TABLE 4

|  | Example 8 | Comp. Example 3 | Example 9 | Comp. Example 4 |
|---|---|---|---|---|
| Vulcanization properties | | | | |
| (temperature °C.) | 160 | 160 | 170 | 170 |
| Optimum vulcanization time (min) | 12 | 23 | 3.6 | 3.4 |
| Mooney viscosity (100° C.) ML 1 + 4 | 76 | 90 | | |
| Vulcanization conditions | | | | |
| press | 160° C. × 30 min | | 180° C. × 6 min | |
| oven | 200° C. × 24 hrs | | 200° C. × 16 hrs | |
| Properties in ordinary state | | | | |
| Hardness | 80 | 80 | 66 | 65 |
| Tensile strength at break | 154 | 155 | 141 | 149 |
| Tensile elongation at break | 240 | 270 | 393 | 465 |
| 100% modulus | 62 | 54 | 28 | 25 |
| Extrusion properties | | | | |
| Extrusion speed (cm/min) | 81 | 77 | | |
| Extrudate texture (point) | 3 | 3 | | |
| Edge (point) | 4 | 3.5 | | |
| Compression set | | | 13 | 19 |
| Compression conditions | | | 150° C. × 70 hrs | |

TABLE 5

|  | Example 10 | Example 11 | Example 12 |
|---|---|---|---|
| Formulation | | | |
| Fluorine-containing elastomer B | 30 | | |
| Fluorine-containing elastomer C | 70 | | |
| Fluorine-containing elastomer D | | 100 | 100 |
| SRF carbon black | 25 | | 20 |
| MT carbon black | | 5 | |
| Calcium hydroxide | 3 | | |
| Calcium hydroxide (2) | 3 | 6 | 2 |
| High-activity magnesium oxide | | 3 | |

TABLE 5-continued

|  | Example 10 | Example 11 | Example 12 |
|---|---|---|---|
| Low-activity magnesium oxide | 8 |  | 6 |
| Bisphenol AF | 1.3 | 2 | 1.1 |
| Benzyltriphenylphosphonium chloride | 0.3 | 0.3 | 0.2 |
| Octadecylamine | 1 | 0.5 | 0.5 |
| Calcium stearate | 1 |  |  |
| STRUKTOL WS280 | 2 |  |  |
| Candelilla wax |  |  | 1 |

In Table 5:

Fluorine-containing elastomer D: a ternary fluororubber which contains 54% by weight of VDF, 25% by weight of HFP, and 21% by weight of TFE, and 67% by weight of fluorine, each based on the total weight of VDF, HFP and TFE, and which has a mooney viscosity of 110 (ML121 °C. 1+10).

Calcuium hydroxide (2): "Rhenofit-CF" manufactured and sold by Rhein Chemie Rheinau GmbH, Germany STRUKTOL WS280: a processing aid manufactured and sold by SCHILL & SEILACHER, Germany

TABLE 6

|  | Example 10 | Example 11 | Example 12 |
|---|---|---|---|
| Vulcanization properties (temperature °C.) | 170 | 170 | 185 |
| Optimum vulcanization time (min) | 6.5 | 9.9 | 5.3 |
| Vulcanization conditions |  |  |  |
| press | 160° C. 30 min | 170° C. 10 min | 185° C. 5 min |
| oven | 200° C. 24 hrs | 232° C. 24 hrs | 232° C. 24 hrs |
| Properties in ordinary state |  |  |  |
| Hardness | 81 | 58 | 76 |
| Tensile strength at break | 144 | 138 | 249 |
| Tensile elongation at break | 290 | 270 | 245 |
| 100% modulus | 55 | 24 | 71 |
| Thermal deterioration resistance |  |  |  |
| 200° C. × 70 hrs |  |  |  |
| Tb | 8 |  |  |
| Hb | −16 |  |  |
| Hs | 1 |  |  |
| Compression set |  |  |  |
| 150° C. × 70 hrs |  | 4 |  |
| 175° C. × 70 hrs |  |  | 13 |
| Properties under high temperature conditions (150° C.) |  |  |  |
| Tensile strength at break |  |  | 54 |
| Tensile elongation at break |  |  | 175 |
| 100% modulus |  |  | 33 |

Tb: Change in tensile strength at break (%)
Eb: Change in tensile elongation at break (%)
Hs: Change in hardness (point)

Industrial Applicability

The vulcanizable, fluorine-containing elastomer composition of the present invention is capable of providing a vulcanization product having not only various excellent properties, but also excellent sealability at high temperatures, and the elastomer composition per se is remarkably improved with respect to mold release properties, flowability, and workability in vulcanization molding, particularly in vulcanization molding by injection. Therefore, by the use of the fluorine-containing elastomer composition of the present invention, a vulcanization product having desired excellent properties can be produced with high productivity.

We claim:

1. A vulcanizable, fluorine-containing elastomer composition comprising:
   (a) a vulcanizable, fluorine-containing elastomer;
   (b) a polyol vulcanizing agent;
   (c) an aliphatic amine compound represented by the formula:

$$R_\alpha NH_\beta \qquad (I)$$

wherein R represents an alkyl group having 12 to 22 carbon atoms, α represents an integer of from 1 to 3, and β represents 3 minus α; and
   (d) a vulcanization accelerator comprising at least one member selected from the group consisting of a phosphonium salt, an ammonium salt, an iminium salt, a sulfonium salt, and an aminophosphine derivative.

2. The vulcanizable, fluorine-containing elastomer composition according to claim 1, wherein said polyol vulcanizing agent is present in an amount of from 0.1 to 10 parts by weight per 100 parts by weight of said vulcanizable, fluorine-containing elastomer.

3. The vulcanizable, fluorine-containing elastomer composition according to claim 2, wherein said polyol vulcanizing agent is present in an amount of from 0.5 to 5 parts by weight per 100 parts by weight of said vulcanizable, fluorine-containing elastomer.

4. The vulcanizable, fluorine-containing elastomer composition according to claim 1, wherein said vulcanization accelerator is present in an amount of from 0.05 to 10 parts by weight per 100 parts by weight of said vulcanizable, fluorine-containing elastomer.

5. The vulcanizable, fluorine-containing elastomer composition according to claim 4, wherein said vulcanization accelerator is present in an amount of from 0.1 to 5 parts by weight per 100 parts by weight of said vulcanizable, fluorine-containing elastomer.

6. The vulcanizable, fluorine-containing elastomer composition according to claim 1, wherein R represents an alkyl group having 14 to 18 carbon atoms.

7. The vulcanizable, fluorine-containing elastomer composition according to claim 1, wherein said aliphatic amine compound is present in an amount of from 0.05 to 10 parts by weight per 100 parts by weight of said vulcanizable, fluorine-containing elastomer.

8. The vulcanizable, fluorine-containing elastomer composition according to claim 7, wherein said aliphatic amine compound is present in an amount of from 0.1 to 5 parts by weight per 100 parts by weight of said vulcanizable, fluorine-containing elastomer.

9. The vulcanizable, fluorine-containing elastomer composition according to claim 1, which further includes a processing aid comprising at least one higher fatty acid ester.

10. The vulcanizable, fluorine-containing elastomer composition according to claim 9, wherein said higher aliphatic acid ester comprises from 30 to 70 carbon atoms.

11. The vulcanizable, fluorine-containing elastomer composition according to claim 9, wherein said processing aid is a wax.

12. The vulcanizable, fluorine-containing elastomer composition according to claim 11, wherein said wax comprises at least one member selected from the group consisting of candelilla wax, carnauba wax, rice bran wax, montan wax and shellac wax.

13. The vulcanizable, fluorine-containing elastomer composition according to claim 9, wherein said processing aid is present in an amount of from 0.1 to 10 parts by weight per 100 parts by weight of said vulcanizable, fluorine-containing elastomer.

14. The vulcanizable, fluorine-containing elastomer composition according to claim 13, wherein said processing aid is present in an amount of from 0.2 to 5 parts by weight per 100 parts by weight of said vulcanizable, fluorine-containing elastomer.

* * * * *